UNITED STATES PATENT OFFICE.

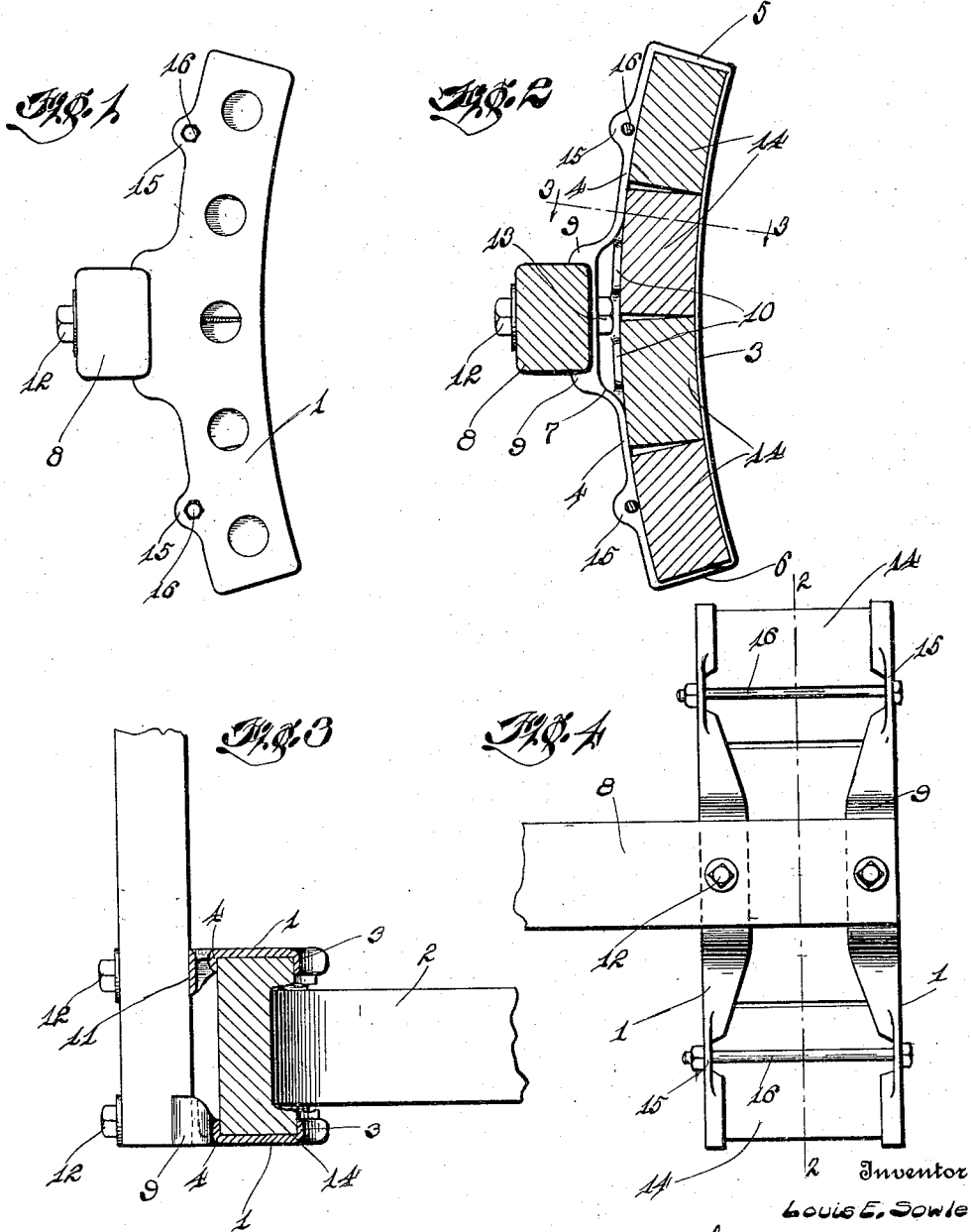

LOUIS E. SOWLE, OF SPOKANE, WASHINGTON.

BRAKE-SHOE.

1,201,520.  Specification of Letters Patent.  Patented Oct. 17, 1916.

Application filed December 20, 1915. Serial No. 67,836.

*To all whom it may concern:*

Be it known that I, LOUIS E. SOWLE, a citizen of the United States, residing at Spokane, in the county of Spokane and State of Washington, have invented certain new and useful Improvements in Brake-Shoes, of which the following is a specification.

This invention relates to improvements in brake shoes of that character which are principally designed for use in connection with road vehicles, such as wagons. In this class of brake shoes it has been heretofore customary to make a shell structure, of a rigid and non-adjustable type, between which the brake blocks were interposed and held in different ways and by various means. Brake shoes of this character, were only adapted for tires of predetermined widths of tread and therefore it was found impossible to get up a stock brake shoe which could be adapted to any width of tread of tire.

Now it is one of the novel features of my invention to provide a construction which will permit of the use of broad gage brake blocks or intermediate or narrow gage brake blocks with the same frame or construction for holding the blocks in position, and also holding the brake upon the brake beam.

It is also a novel feature of my invention to provide a brake shoe of this character, having independent sides, with means which performs the dual function of anchoring said independent sides to the brake beam and holding said independent sides in clamped relation against the brake blocks.

Further objects and novel features of my invention will be more fully described in connection with the accompanying drawing and will be more particularly pointed out in and by the appended claims.

In the drawing:—Figure 1 is a view in side elevation of my improved brake shoe attached to a brake beam. Fig. 2 is a sectional view on line 2—2 of Fig. 4. Fig. 3 is a horizontal sectional view on line 3—3 of Fig. 2 showing the manner in which the brake blocks wear down when applied to a wagon wheel. Fig. 4 is a view looking from the left of Fig. 1.

Like characters of reference designate similar parts throughout the different figures of the drawing.

As illustrated, my invention includes a frame which is composed of independent side members 1 which are identical in size and construction. As shown more particularly in Figs. 1 and 2, the side members 1 are arcuate to correspond with the curvature of the periphery of a wagon wheel 2, against the tread of which latter the shoe is adapted to be applied. Preferably extending along all four margins of each side member 1, is a retaining flange, the concave flanges being indicated at 3, the convex flanges at 4, and the top and bottom flanges at 5 and 6. The convex flange 4 is centrally off-set, as indicated at 7 to form a seat for receiving a brake beam 8. The seat or recess formed by the off-set flange 7 is provided with lugs 9 which extend along the sides of the beam 8 so as to form a structural chair for the beam which will locate the latter accurately with respect to the frames 1. The convex flange 4 may be continued by sections 10, as clearly shown by Fig. 2.

The beam chairs with which each member 1 is provided, are equipped with relatively broad transverse beam engaging faces 11 so that when the side members 1 are secured to the beam 8 said members will be rigidly held in a right angular position with respect to the longitudinal axis of the beam 8. I prefer to anchor the side members 1 to the beam 8 by independent devices which may be in the form of bolts 12 which are shown extending through the beam and also through the beam chairs and through the off-set flange 7. Thus the heads 13 of the bolts will lie between the off-set flange 11 and the sectional flanges 10.

Before the brake is assembled to be secured to the beam 8, I interpose a plurality of brake blocks 14 between the side members 1, the brake blocks 14 being shaped and proportioned to seat against the body portions of the side members 1 and between the flanges 3, 4, 5 and 6. Thus when the side members 1 are assembled and anchored to the beam 8, they will be rigidly held in position so as to lock the brake blocks in place. Thus it will be seen that the bolts 12 perform the dual function of holding the brake shoe to the brake beam and also anchoring the side members 1 in locked relation against the brake blocks 13.

In order to take some of the strain off from the bolts 12, and to in some cases provide additional means for anchoring the independent sides 1, I may provide the latter with lugs 15 for projection therethrough of bolts 16.

It will be seen by reference to Fig. 3, that the blocks 14 can be connected in accordance with the width of the treads 2, of the wheel, in such a manner as to always prevent wear of the wheel against the side members 1. It is always preferable to have the blocks 14 of sufficient width to permit the wheel to wear into the blocks at a suitable distance between the side members 1, or in other words from the side members 1.

With the device of my invention, the side frame members 1 can be made uniform and sold in large quantities, and blocks can also be sold or made so that the brake shoe can be assembled to set any desired wheel.

It is believed that the advantages and utility of my invention will be understood from the foregoing description, and while I have herein shown and described one specific form of my invention, I do not wish to be limited thereto except for such limitations as the claims may import.

I claim:—

1. In a brake shoe, independent side members each having block retaining flanges extending along all margins of each side member, brake blocks interposed between said retaining side members and in engagement with said flanges, a brake beam, and means for connecting said side members with said brake beam and holding said side members tightly engaged against said block, substantially as described.

2. In a brake shoe, a plurality of brake blocks, a brake beam, independent side members each having block retaining flanges extending along all margins of each side member, and means anchoring said independent side members to said beam in tight frictional engagement on opposite sides of said blocks, substantially as described.

3. In a brake shoe, independent side members each having block retaining flanges extending along all margins of each side member, brake blocks interposed between said retaining side members and in engagement with said flanges, and means extending laterally of said brake blocks and connected with said retaining side members to hold the latter in tight engagement against said brake blocks, substantially as described.

In testimony whereof I affix my signature.

LOUIS E. SOWLE.

Copies of this patent may be obtained for five cents each, by addressing the "Commissioner of Patents, Washington, D. C."